United States Patent [19]

Jérôme

[11] Patent Number: 5,060,465

[45] Date of Patent: Oct. 29, 1991

[54] TRANSPORTABLE FARM MACHINE FOR WINDROWING PRODUCTS

[75] Inventor: Aron Jérôme, Bouxwiller, France

[73] Assignee: Kuhn S.A., Saverne, France

[21] Appl. No.: 536,477

[22] Filed: Jun. 12, 1990

[30] Foreign Application Priority Data

Jun. 16, 1989 [FR] France ................. 89 08233

[51] Int. Cl.⁵ .......................................... A01D 78/12
[52] U.S. Cl. ........................................ 56/367; 56/377; 56/DIG. 21
[58] Field of Search ................ 56/366, 367, 370, 372, 56/377, 379, 380, DIG. 14, DIG. 21

[56] References Cited

U.S. PATENT DOCUMENTS 3,820,314  6/1974  Reber ................................. 56/377
3,910,020  10/1975  Spindler ............................ 56/377

FOREIGN PATENT DOCUMENTS 1907337  1/1970  Fed. Rep. of Germany .
1482771  2/1970  Fed. Rep. of Germany .
2423326  12/1974  Fed. Rep. of Germany .
1415872  9/1965  France .
1532881  6/1968  France .
2179024  11/1973  France .
2355440  1/1978  France .
2046566  11/1980  United Kingdom .

Primary Examiner—Terry L. Melius
Attorney, Agent, or Firm—Oblon, Spivak, McClelland, Maier & Neustadt

[57] ABSTRACT

A transportable farm machine for windrowing products includes a frame which can be connected to a tractor, a rotor mounted to the frame for rotation about a vertical axis, and a plurality of toolholder arms mounted to the rotor such that the tools mounted on the toolholder arms may form the product into windrows during rotation of the rotor. Each of the toolholder arms includes an inside part mounted to the rotor and an outside part to which the tools are mounted and which is conencted to the inside part by a joint about which the outside part can be displaced between a work position and a transport position. The joint includes a first pivot for pivoting the outside part around the longitudinal axis of the inside part, a second pivot for pivoting the outside part about an axis forming a positive angle relative to the axis of the first pivot and a locking device for locking the outside part in the work position. For transport, the outside part is pivoted about the axis of the second pivot to the transport position in which the outside end of the outside part is connected to the joint of an adjacent arm. As a result, the outer periphery of the machine corresponds to a circle lying on the outside ends of the inner parts, and the size of the farm machine is reduced.

21 Claims, 7 Drawing Sheets

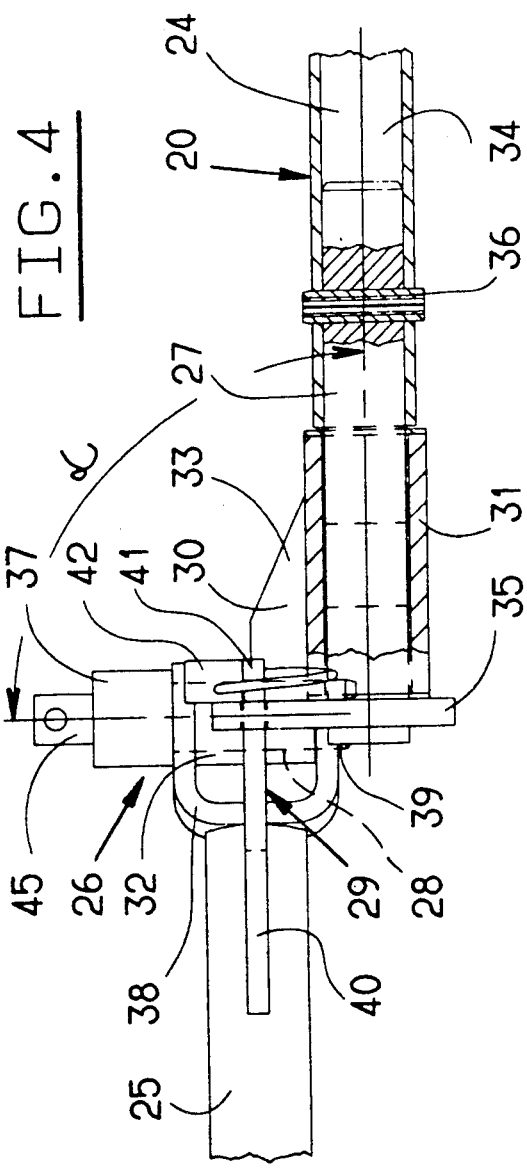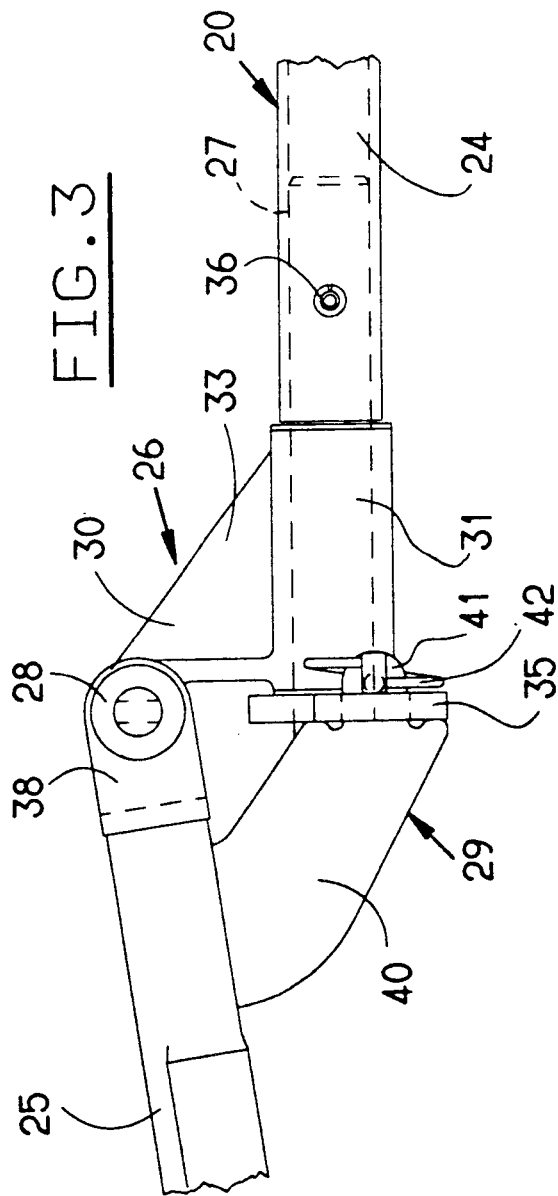

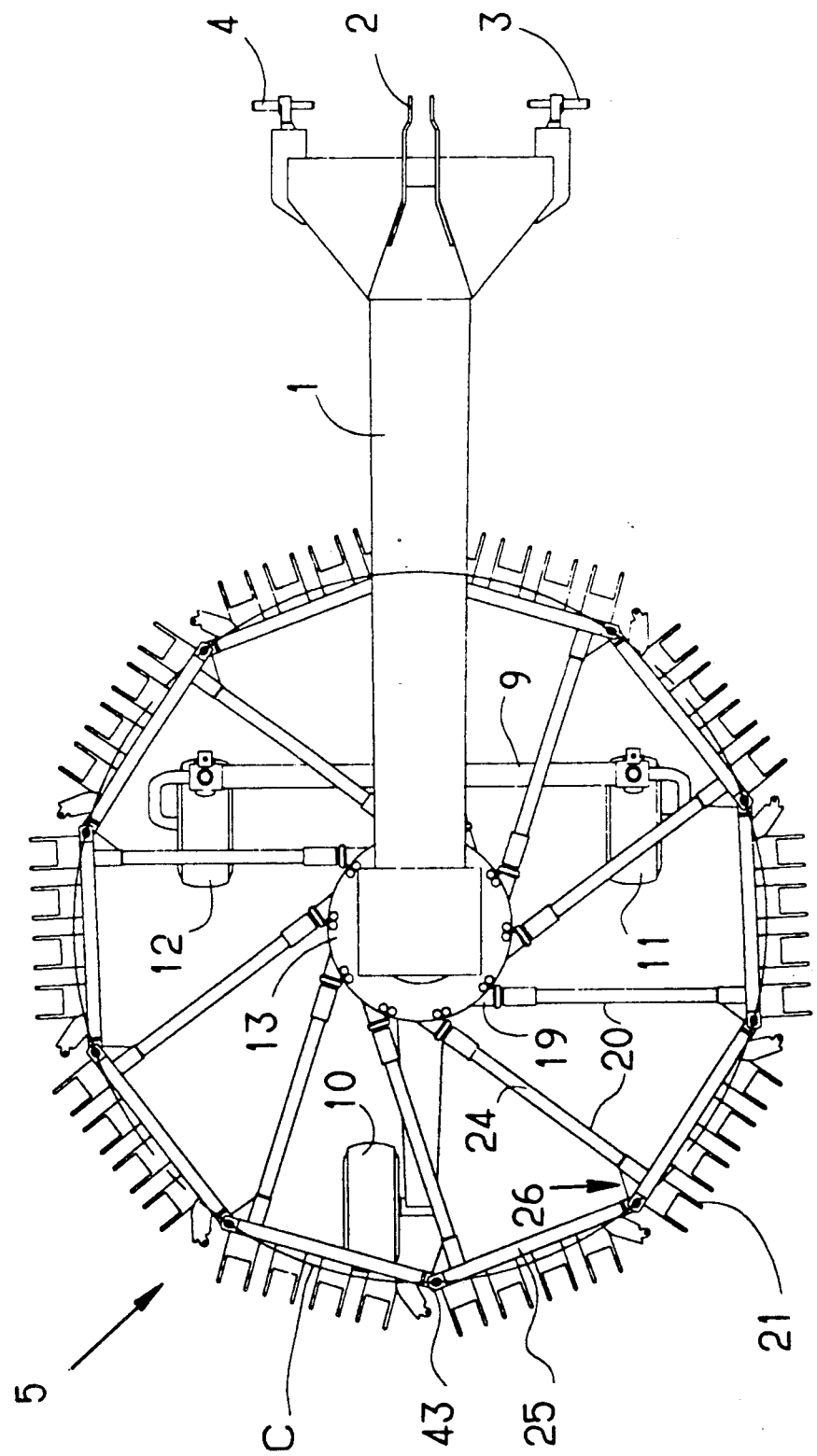

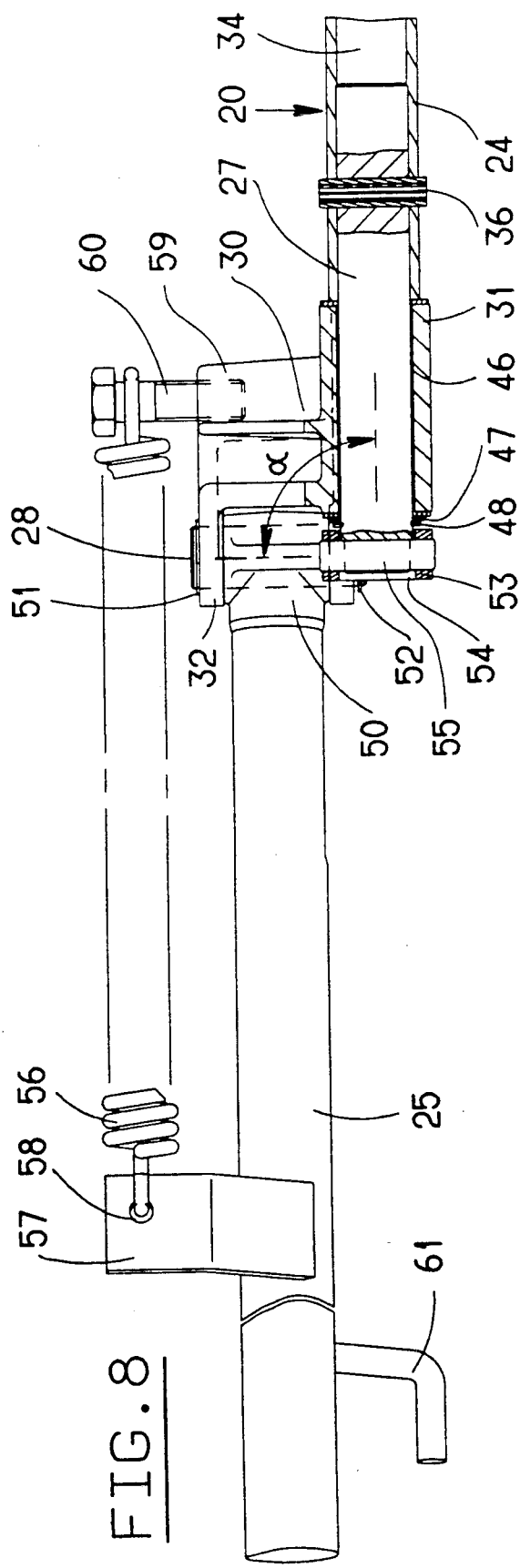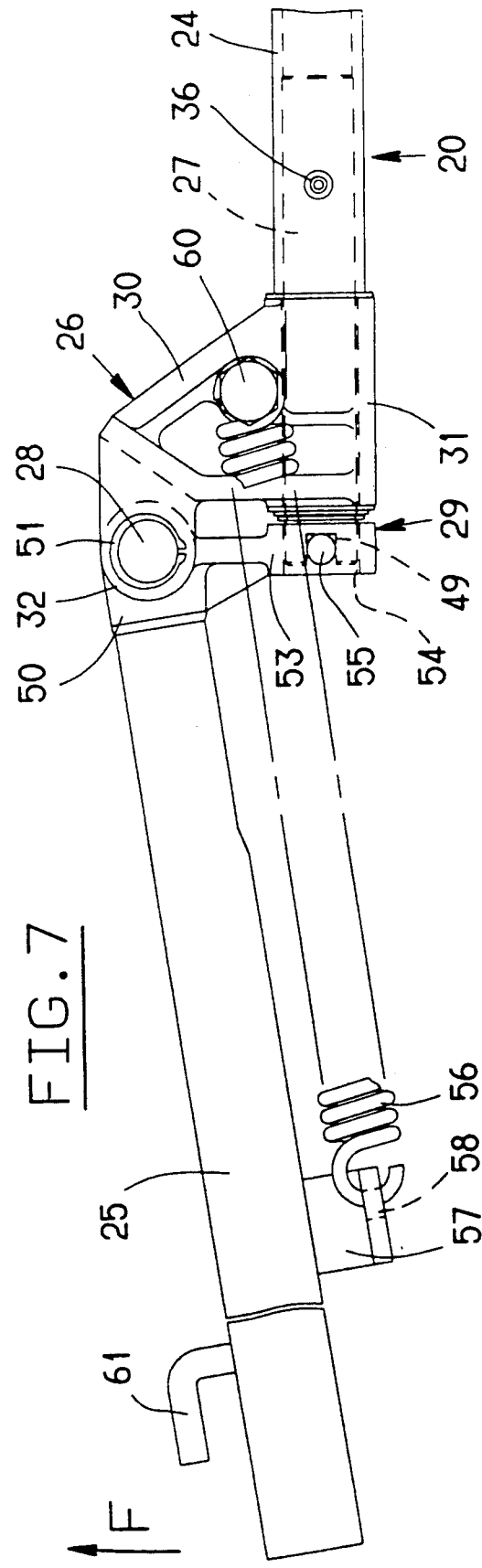

TRANSPORTABLE FARM MACHINE FOR WINDROWING PRODUCTS

BACKGROUND OF THE INVENTION

1. Field of the Invention

This invention relates to a farm machine for windrowing of products, having a frame which can be connected to a tractor and which comprises at least one rotor rotating around an approximately vertical pin. The rotor has a central housing carrying toolholder arms and in which is located a cam which controls said toolholder arms so that during each revolution they pivot around their respective geometric axes so that their tools gather then lay down the products in the form of a windrow. The toolholder arms are made of at least one inside part which is located close to the central housing and one outside part which carries the working tools and which is connected to the inside part by a joint around which it can be displaced for transport.

2. Background of the Related Art

In a machine of this type, known in FR 2 355 440, the rotor comprises two arms, each having an outside part that can be folded downward around a pin crosswise to the direction in which the respective arm extends. For transport, the two folded arms are brought to the left side of the machine to reduce its width. It then is necessary to lock the rotor to prevent these two arms from being displaced. Such a displacement would cause both an upward pivoting of the folded parts because of the control performed by the cam and the arrival of non-folded arms on the side of the machine, with a resulting increase of the width. In addition, such pivoting of the folded parts of the arms can cause damage in case of an encounter with the frame or the adjacent arms. This construction therefore is relatively undesirable. Moreover, it is not suitable for adequately reducing the dimensions of very large machines or forwardly positioned machines. On these machines, it is necessary to shorten all the toolholder arms to reduce both their width and their length for transport.

On another known machine, all the toolholder arms of the rotor are made of two telescopic parts. For transport, the radially outer parts of the arms are slid radially inwardly to reduce the diameter of the rotor. This arrangement is very fragile, however. The sliding of the outer parts is restrained or impeded by the earth or plant debris which can stick between the telescoping parts, by rust or by even slight deformations which can result from impacts suffered by the arms. For these various reasons, this solution is hardly suitable for the adjustment of the arms on farm machines intended for windrowing.

In another known machine, each toolholder arm of the rotor comprises an outside part which can be disconnected from an inside part. The outside part which carries the working tools can be attached to the frame of the machine for transport. In this case, it is necessary for the user to manually remove all the outside parts during each transposition from the work position to the transport position, and vice versa. Because of the large number of parts to be displaced and the weight of the latter, this operation is relatively difficult to perform. Consequently, only some arms may be transposed and others left in their work position, which is dangerous in case of displacement on a road.

SUMMARY OF THE INVENTION

This invention has as an object a machine with jointed toolholder arms not having the drawbacks of the known machines.

The above, and other, objects are achieved according to the present invention by a transportable farm machine for windrowing products, including a frame which can be connected to a tractor, a rotor mounted to the frame for rotation about a vertical axis, and a plurality of toolholder arms mounted to the rotor such that the tools mounted on the tool holder arms may form the products into windrows during the rotation of the rotor. Each of the toolholder arms comprises an inside part mounted to the rotor and an outside part to which the tools are mounted and which is connected to the inside part by a joint about which the outside part can be displaced between a work position and a transport position. The joint comprises a first pivot comprising means for pivoting the outside part around the longitudinal axis of the inside part, a second pivot comprising means for pivoting the outside part about an axis forming a positive angle relative to the axis of the first pivot, and locking means for locking the outside part in the work position. The outside part can thus pivot about the axis of the second pivot to the transport position in which the outside part is not coaxial with the inside part, and the size of the farm machine is thus reduced.

In the work position, the two parts of each toolholder arm are connected to one another so that they pivot together.

For transport, the outside part of each toolholder arm is unlocked and is displaced around the second pivot, so that it is located approximately on an imaginary circle passing through the ends of the inside parts of the arms. When all the outside parts of the toolholder arms are folded as described above, the diameter of the rotor is reduced considerably. In this new position, the first pivot makes it possible for the outside part of each arm to remain practically immobile relative to the corresponding inside part even if the latter pivots under the action of a control cam of the rotor.

This invention makes it possible to pass easily from the work position to the transport position and vice versa. It is not necessary for the outside parts of the arms to be detached or to be fitted into the inside parts. In addition, the rotor can rotate without there being any risk of damage to the folded toolholder arms.

Another characteristic of the invention consists in that the inside part of each toolholder arm is approximately straight and the first pivot extends coaxial to this inside part. In this manner, the corresponding outside part is totally insensitive to the pivotings of the inside part due to the cam, in the folded position for transport.

Another characteristic of the invention consists in that, at the joint between the two parts of each toolholder arm, locking means are provided to integrate the outside part with the corresponding inside part or with the pivot integral with the inside part. These locking means make it possible to hold the outside part of each arm in a work position and to make it pivot with the corresponding inside part in this position.

According to another characteristic of the invention, the outside part of each arm comprises a lug or an attachment hook making it possible to connect it to the inside part of an adjacent arm in the transport position.

BRIEF DESCRIPTION OF THE DRAWINGS

Other characteristics and advantages of the invention will be evident from the claims and the description below of the nonlimiting embodiments of the invention, with reference to the accompanying drawings in which:

FIG. 3 is, in larger scale, a top view of the joint of a toolholder arm in the work position;

FIG. 4 is a front view, with a partial section, of the joint;

FIG. 5 is a top view of the machine according to the invention in the transport position;

FIG. 7 is a top view of a variant embodiment of the joint of a toolholder arm in the work position;

FIG. 8 is a front view, with a partial section, of the variant embodiment; and

DETAILED DESCRIPTION OF THE PREFERRED EMBODIMENTS

Figure 1:
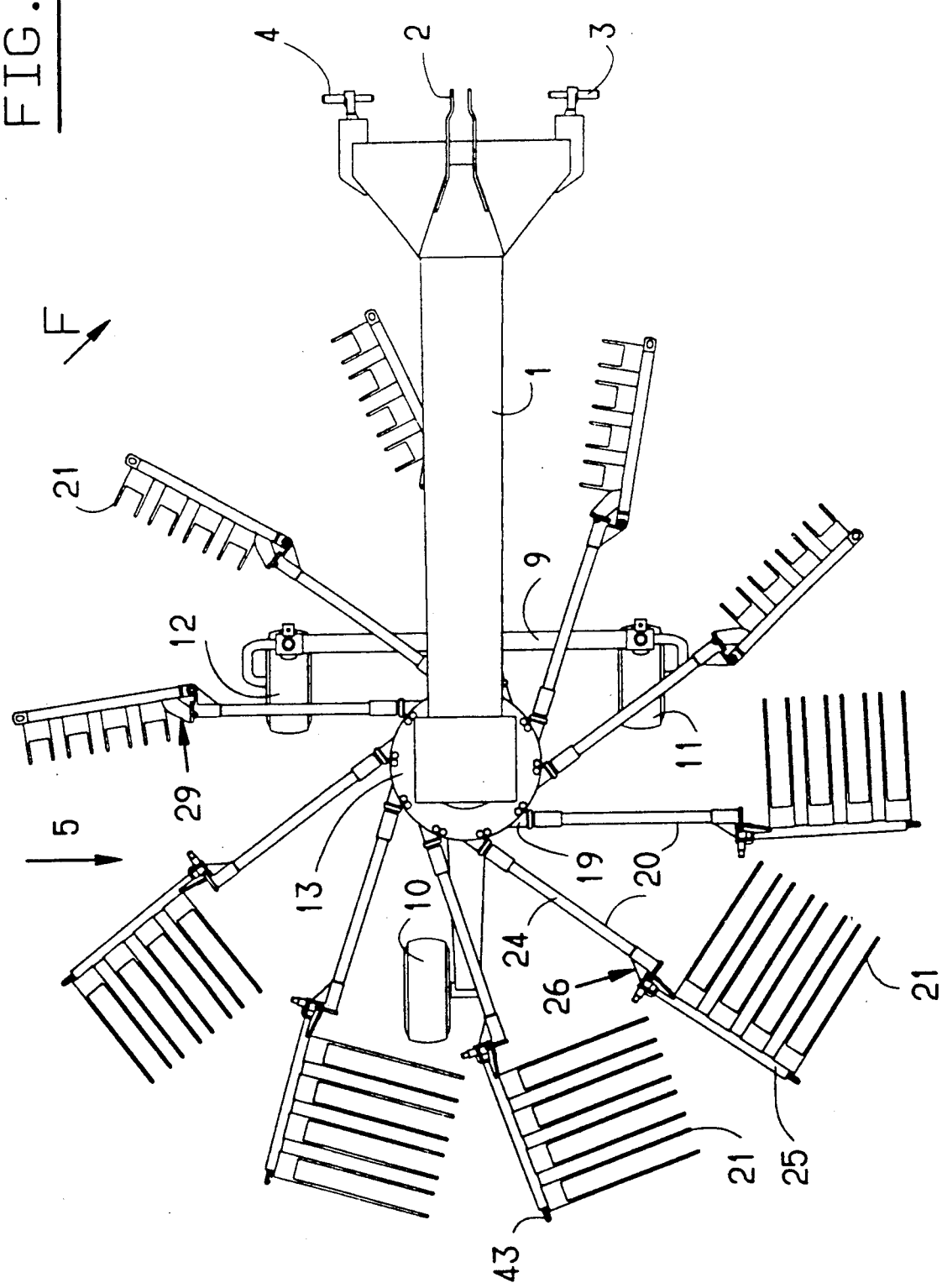
FIG. 1 is a top view of a machine according to the invention in the work position.
Figure 2:
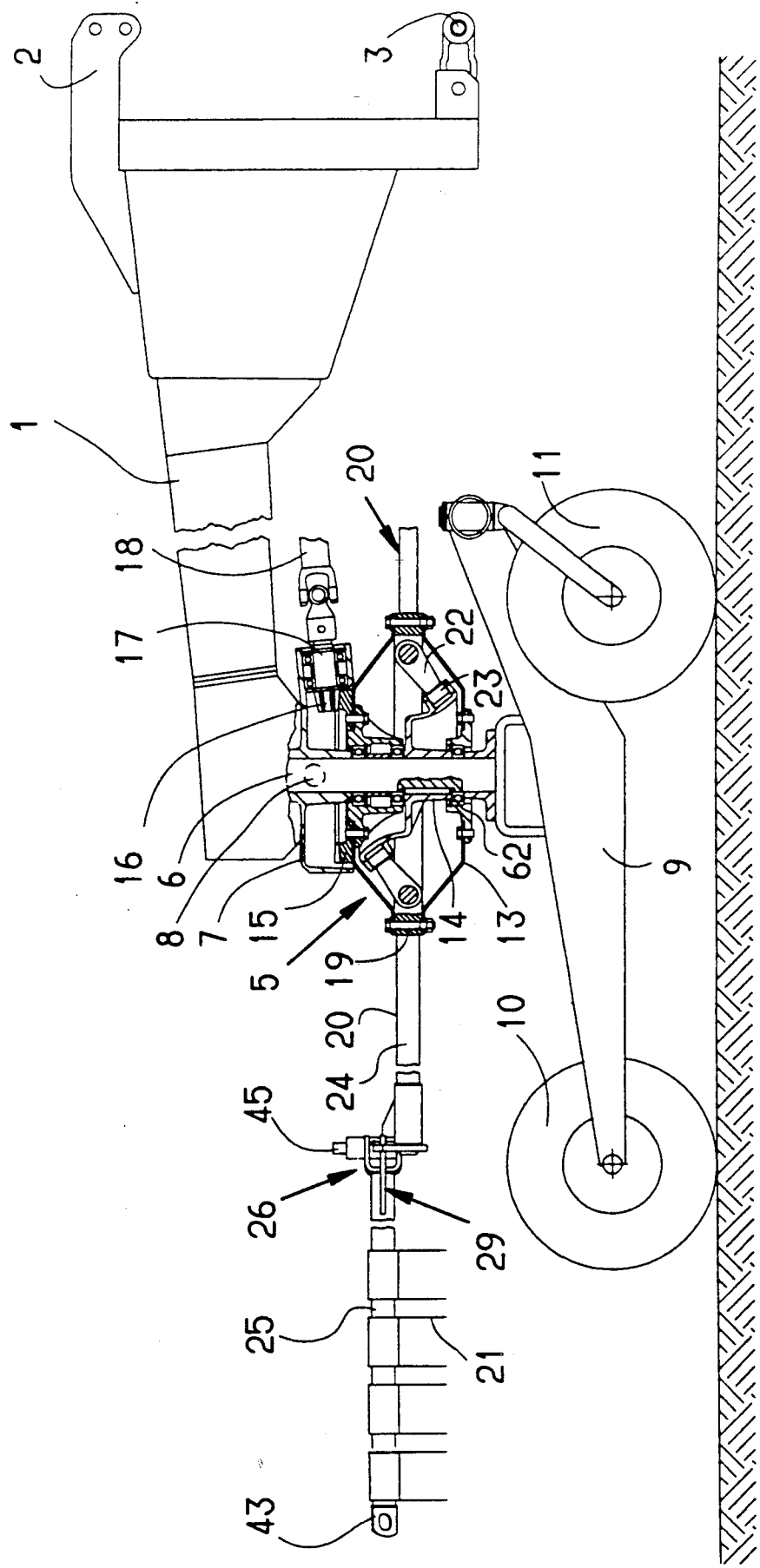
FIG. 2 is a side view, partially in section, of the machine according to FIG. 1.

As it is shown in FIGS. 1 and 2, the machine according to the invention has a frame (1) in the shape of an approximately horizontal beam. The front end of said frame has three hooking points (2, 3, 4) used for coupling to a hydraulic lifting device of a tractor, not shown. A windrowing rotor (5) which can be driven in rotation in the direction of arrow (F) is connected to the rear end of this frame (1).

The rotor (5) is mounted so as to be able to rotate on an approximately vertical support pin (6). The upper end of this pin (6) is housed in a housing (7) which itself is jointed on frame (1) by an approximately horizontal pin (8). The lower end of support pin (6) is connected to a T-shaped frame (9) which carries three small wheels (10, 11, 12) moving on the ground during work. Rotor (5) has a central housing (13) which is mounted on support pin (6) by ball bearings (62). It is located between housing (7) and frame (9). A control cam (14), which is integral with support pin (6), is located in this housing (13). The upper part of said housing (13) is provided with a ring gear (15). The latter engages with a driving pinion (16) which is attached to a shaft (17) connected, in a known manner, to the power takeoff shaft of the tractor via drive shafts (18). Ring (15) and pinion (16) are located in housing (7) which assures their protection.

Housing (13) carries at its periphery bearings (19) in which toolholder arms (20) are housed so that they can pivot around their longitudinal geometric axes. These arms (20) extend from housing (13) in the form of spokes. At their end farthest from said housing, they are provided with tools (21) consisting of raking forks placed side to side. The other end of each arm (20) is located in the housing (13) and carries a lever (22) provided with a roller (23) which is guided in control cam (14).

Each of these toolholder arms (20) is made of at least one inside part (24) which is located close to central housing (13) and one outside part (25) which carries working tools (21). These two parts (24 and 25) are connected to one another by a joint (26) exhibiting two pivots (27 and 28) (see FIGS. 3, 4 and 6 to 9). First pivot (27) is directed approximately in the same direction as corresponding inside part (24) so that it permits rotation about the longitudinal axis of inside part (24), and second pivot (28) provides pivoting about an axis extending at a positive (i.e., non-zero) angle ($\alpha$) relative to said first pivot. At the location of this joint (26), locking means (29) are provided to integrate outside part (25) of each arm (20) with its inside part (24) in the work position.

In the embodiment shown in FIGS. 1 to 6, two pivots (27 and 28) of each joint (26) are offset relative to one another. Seen in direction of rotation (F), second pivot (28) is located in front of first pivot (27). They are connected by a junction part 30. The latter consists of two bearings (31 and 32) which are connected to one another by a lug (33) and each of which has a bore for one of said pivots. It further is seen that inside part (24) of each arm (20) is approximately straight and comprises at least one hollow end (34). First pivot (27) extends approximately coaxially of the inside part (24). This pivot (27) has a cylindrical shape and has a retainer ring (35) at one of its ends. It is engaged in the bore of a first bearing (31) of junction part (30) and in hollow end (34) of inside part (24). It is locked in said inside part by a pin (36) extending therethrough.

Second pivot (28) also has a cylindrical shape and comprises a shoulder (37) at one of its ends. It is housed in the bore of the second bearing (32) of junction part (30), except for the shoulder (37). This bore is directed so that the value of angle ($\alpha$) that the two pivots (27 and 28) form between one another is approximately equal to 90°. At its end which is directed toward central housing (13), outside part (25) of each arm (20) comprises a joint yoke (38) at opposite axial end of bearing (32) and having apertures through which second pivot (28) passes. The latter is stopped axially by shoulder (37) bearing on the arm of the yoke (38) bearing on the upper end of bearing (32) and by a circlip (39) mounted on the end of pivot (28) and bearing on the other arm of yoke (38) (see FIG. 4).

Means (29) to lock the two parts (24 and 25) of each arm (20) to each other can be seen clearly in FIGS. 3 and 4. Each outside part (25) comprises, close to its end which is oriented toward central housing (13, a lug (40) extending in a plane radial to the outside part (25). This lug (40) has a locking lug (41) which is oriented so that it extends approximately parallel to inside part (24) in the work position. Retainer ring (35) of first pivot (27) has an opening whose size corresponds approximately to the section of lug (41). The latter thus can be engaged in said opening and be stopped relative to retainer ring (35) by a pin (42).

At its end opposite to joint (26), outside part (25) of each arm (20) also comprises an attachment lug (43) directed approximately perpendicular to the plane in which working tools (21) extend. This lug (43) defines a hole (44) of elongated shape. At its end which is directed upward, each second pivot (28) comprises a stud (45) of a height greater than the thickness of attachment lug (43). Each of these attachment lugs (43) thus can be hooked to the stud (45) of the pivot (28) of the joint (26) of the preceding arm (20). For this purpose, the distance between second pivot (28) and attachment lug (43) of same outside part (25) is equal to the distance between second pivots (28) of adjacent joints (26).

Figure 9:
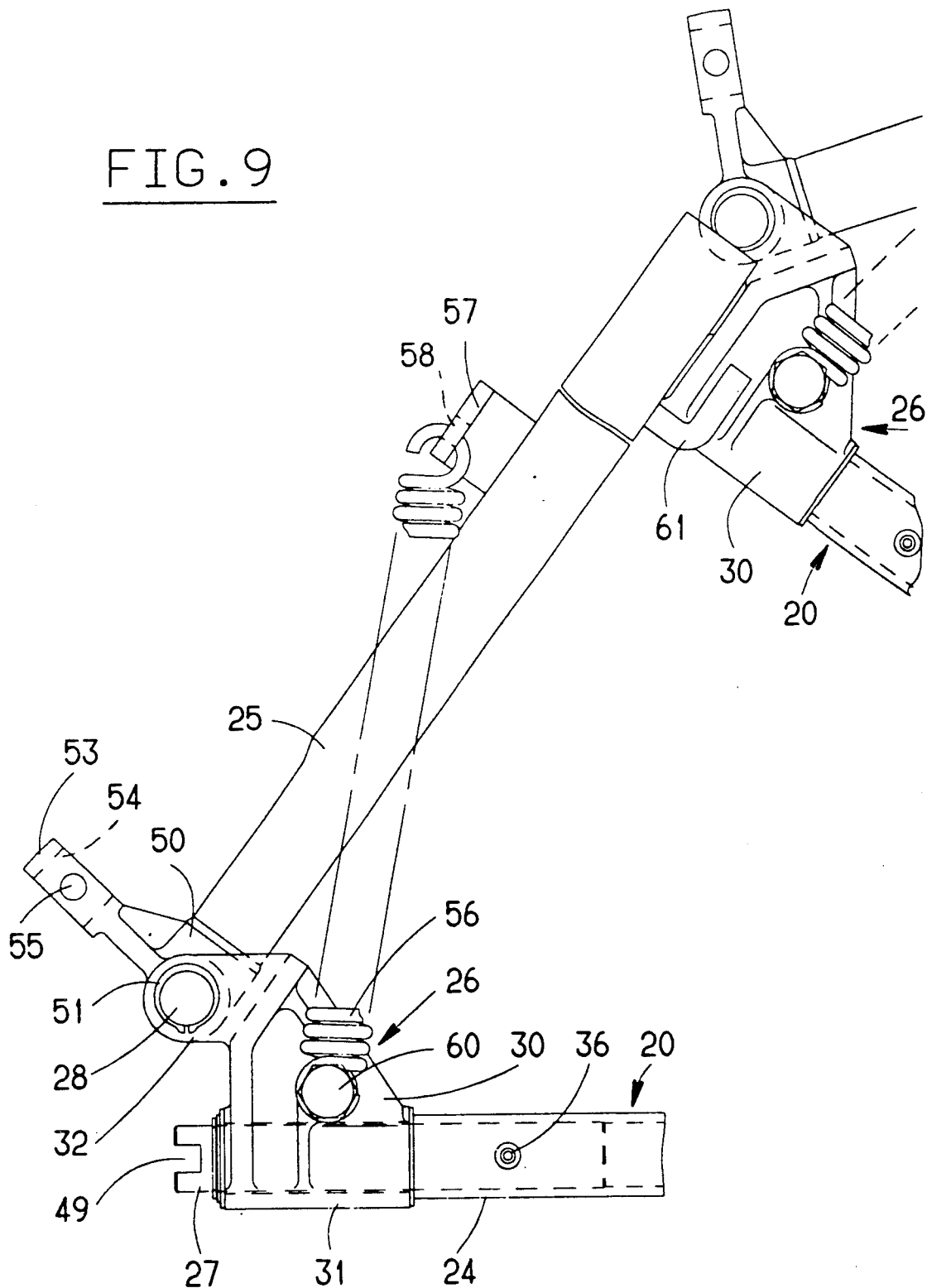
FIG. 9 is a top view of the variant embodiment, in the transport position.

The variant embodiment according to FIGS. 7 to 9 comprises a large number of parts common to the embodiment described above. These common parts are designated by the same references. In this variant, second pivot (28) of each joint (26) also is offset forward (seen in direction of rotation (F) of the rotor) relative to first pivot (27). These two pivots (27 and 28) are approximately cylindrical and form an angle (α) of about 90° between one another. Said first pivot (27) is engaged in hollow end (34) of inside part (24) of toolholder arm (20) and is locked there by a pin (36). A junction part (30) is mounted on first pivot (27). The former comprises a cylindrical bearing (31) with a bore for mounting of first pivot (27) and a bearing (32) in the form of a yoke, in which second pivot (28) is housed.

Rings (46) are provided in the bore of bearing (31) to facilitate the rotation of pivot (27) relative to junction part (30). The latter is locked in the axial direction on pivot (27) by inside part (24), and by a washer (47) and a circlip (48). First pivot (27) projects beyond said bearing (31) and has a notch (49) in its free end.

Outside part (25) of each arm (20) comprises an end fitting (50) which is located in the yoke formed by bearing (32) of junction part (30). This end fitting (50) has a crosswise bore through which second pivot (28) passes. The latter is axially immobilized by circlips (51 and 52).

Each end fitting (50) has a locking lug 53) which extends laterally. This lug has a bore (54) whose diameter is slightly larger than that of first pivot (27). In this bore (54) extends a driver (55) of cylindrical shape, which goes through it. In the work position, this lug (53) is engaged on first pivot (27). The end of the latter then is located in bore (54) and driver (55) is housed in notch (49) (FIGS. 7 and 8).

A draw spring (56) connects outside part (25) of each toolholder arm (20) to corresponding junction part (30). For this purpose, each outside part (25) comprises a hooking lug (57). The latter is positioned so that hooking point (58) of spring (56) is located approximately at the same distance from the two ends of outside part (25). Junction part (30) comprises a boss (59) with a bolt (60) which constitutes the other hooking point of spring (56). This point is located closer to central housing (13) of the rotor than second pivot (28) and, seen in direction of rotation (F), more to the rear than said pivot (28). Spring (56) is also located above the plane in which outside part (25) of each arm (20) pivots around second pivot (28). In each position of the outside part (25), spring (56) exerts a pull on it which tends to make it pivot in the direction of central housing (15) of the rotor.

Outside part (25) of each toolholder arm (20) has, close to its farthest end, an attachment hook (61) which can hook around a rib of the junction part (32) of the adjacent arm (20) for immobilizing it in the transport position.

In the work position of the embodiment of FIGS. 1 through 6, outside part (25) of each arm (20) extends more or less coaxial with the corresponding inside part (24). It is locked relative to said inside part by lug (41) which is immobilized in retainer ring (35). In this position, lug (40) rests against this retainer ring (35). When central housing (13) is driven in rotation via ring gear (15) and pinion (16), in the direction of arrow (F), rollers (23) of levers (22), which are connected to inside parts (24), are displaced in cam (14).

The latter then controls two parts (24 and 25) of arms (20) so that during each revolution, they pivot around their geometric axes, so that in the front part of their path, tools (21) are directed to the ground and gather the products, for example, hay, lying on the ground, and in the lateral part of their path, said tools are lifted and lay down the gathered products in the form of a windrow.

Figure 6:
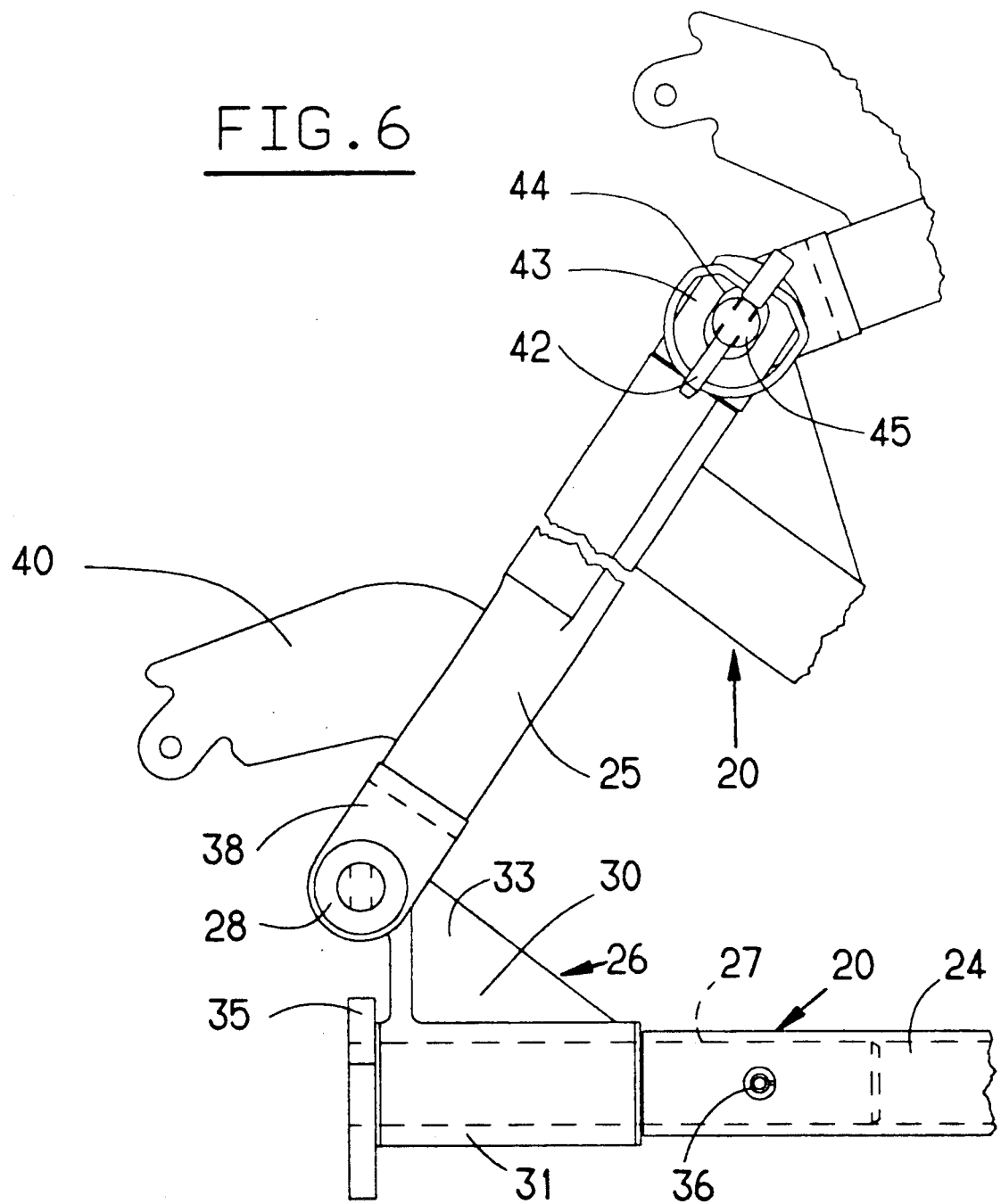
FIG. 6 is a detail view of the joint of a toolholder arm in the transport position.

For transport, lug (41) of outside part (25) of each arm (20) is unlocked by the operator. Each outside part (25) then is displaced around its second pivot (28) in the direction of central housing (13) until its attachment lug (43) can be attached to stud (45) of second pivot (28) of preceding arm (20) (FIGS. 5 and 6). It then can be immobilized by pin (42) which can be engaged in a hole provided in said stud. In this position, these outside parts (25) no longer are controlled by cam (14). It is evident, in particular from FIG. 5, that all these outside parts (25) are located substantially on an imaginary circle (C) passing through ends (34) of inside parts (24) of arms (20). The dimensions of rotor (5) thus are considerably reduced on all the sides, so that the machine can be transported easily. In this position, it also will occupy less room during storage for the period of non-use.

In the variant embodiment according to FIGS. 7 to 9, outside part (25) of each toolholder arm (20) is held in the work position and in the transport position by the draw spring (56). For work, said outside part (25) extends approximately in the same direction as corresponding inside part (24). Its locking lug (53) is then located on the end of first pivot (27). Driver (55) then is housed in notch (49) and thus assures a positive connection between two parts (24 and 25). The pivoting of inside part (24), which results from the displacement of its roller (23) in control cam (14) then is transmitted to outside part (25) so that its tools (21) windrow the plants lying on the ground. In this position, the pressure of the plants on said tools (21) is added to the action of spring (56) and contributes in holding outside part (25) of each arm (20) in the work position.

For transport, outside part (25) of each arm (20) is manually displaced around second pivot (28) in direction of rotation (F), toward central housing (13). Initially, spring (56) is drawn. Then, as soon as it has passed above the corresponding second pivot (28), it contracts and pulls outside part (25) in the direction of central housing (13) of the rotor. Hook (61) then is placed between two ribs of junction part (30) of joint (26) of preceding toolholder arm (20). Outside parts (25) of all arms (20) then are thus folded on the imaginary circle (C) shown in FIG. 5. The possible pivotings of inside parts (24) no longer are transmitted to outside parts (25) and the diameter of the rotor is reduced considerably.

Conversely, to return to the work position, it is sufficient to disconnect outside part (25) from the adjacent toolholder arm (20) and to manually pivot it in the direction opposite to direction of rotation (F), to bring driver (55) into the notch (49) of corresponding first pivot (27).

The transpositions from one position to the other are extremely simple and quick.

It is quite evident that the invention is not limited to such embodiments as described above and shown in the accompanying drawings. Modifications are possible, in particular relative to the composition of various elements or by substitution of equivalent techniques, without thereby going outside the field of protection defined in the claims.

What is claimed as new and desired to be secured by Letters Patent of the United States is:

1. A transportable farm machine for windrowing products, comprising:
- a frame which can be connected to a tractor;
- a rotor mounted to said frame for rotation about a vertical axis;
- a plurality of toolholder arms mounted to said rotor such that tools mounted on said toolholder arms may form the products into windrows during the rotation of said rotor;
- a cam mounted in a central housing of said rotor for pivoting said arms, during rotation of said rotor, around their respective geometric axes;
- each of said toolholder arms comprising an inside part mounted to said rotor and an outside part to which said tools are mounted and which is connected to said inside part by a joint about which said outside part can be displaced between a work position and a transport position, said joint comprising:
  - (a) a first pivot comprising means for pivoting said outside part around the longitudinal axis of said inside part,
  - (b) a second pivot comprising means for pivoting said outside part about an axis forming a positive angle relative to the axis of said first pivot, and
  - (c) locking means for licking said outside part with the corresponding inside part in the work position,
- whereby said outside part can pivot about the axis of said second pivot to the transport position in which said outside part is not coaxial with said inside part and is no longer controlled by said cam and in which the size of said farm machine is reduced.

2. Machine according to claim 1, wherein said inside part of each said toolholder arm is approximately straight and wherein said first pivot is coaxial with said inside part.

3. Machine according to claim 1 or 2, wherein said first and second pivots are offset to one another in the direction of rotation of said rotor.

4. Machine according to claim 3, wherein said second pivot is located in front of said first pivot relative to the direction of rotation of said rotor.

5. Machine according to claim 1, wherein said positive angle is approximately equal to 90°.

6. Machine according to claim 1, wherein said joint comprises a junction part having first and second bearings in which said first and second pivots are respectively housed.

7. Machine according to claim 6, wherein said first pivot is connected to said inside part and said second pivot is connected to said outside part.

8. Machine according to claim 7, wherein said first pivot comprises an end integral with said inside part and another end located at an axially outer side of said second bearing, said another end having a retainer ring.

9. Machine according to claim 1, wherein said outside part comprises at an end thereof a yoke jointed on said second pivot.

10. Machine according to claim 1, wherein said second pivot has a shoulder and a circlip for axially positioning said second pivot in said joint.

11. Machine according to claim 8, wherein said locking means integrate said outside part with said inside part in the work position.

12. Machine according to claim 11, wherein said outside part includes a locking lug connectable to said retainer ring.

13. Machine according to claim 1, wherein said outside part comprises a locking lug provided with a driver, wherein said first pivot has a free end which comprises a notch in which said driver is housed when said outside part is in said work position, and a draw spring connected between said outside part of said arm and said joint.

14. Machine according to claim 13, wherein said draw spring is hooked to said outside part at a point which is located approximately at equal distances from the two ends of said outside part.

15. Machine according to claim 13, wherein said draw spring is hooked to a junction part of said joint at a point which is located closer to a central housing of said rotor than is said second pivot, and as seen in the direction of rotation of said rotor, to the rear of said second pivot.

16. Machine according to claim 13, wherein said draw spring is located above a plane in which said outside part pivots around said second pivot.

17. Machine according to any of claims 1 or 16, wherein said second bearing comprises a yoke and wherein said outside part has an end fitting which is jointed in said second bearing.

18. Machine according to claim 13, wherein said locking lug comprises a bore in which the free end of said first pivot can be housed, and wherein said driver goes through said bore.

19. Machine of claim 1, including means at an outside end of said outside part for attaching said outside end of said outside part to the joint of an adjacent arm when said outside part is pivoted to said transport position.

20. Machine of claim 19, wherein said joint includes a stud and said attaching means comprises a lug fittable on the stud of an adjacent arm.

21. Machine of claim 19, wherein said joint includes at least one rib and said attaching means comprises a hook fittable over the at least one rib of an adjacent arm.

* * * * *